(12) United States Patent
Cheng et al.

(10) Patent No.: US 8,833,780 B2
(45) Date of Patent: Sep. 16, 2014

(54) ACTIVE SUSPENSION SYSTEM AND METHOD

(75) Inventors: Ka Wai Eric Cheng, Kowloon (HK); Xiangdang Xue, Kowloon (HK); Zhu Zhang, Kowloon (HK)

(73) Assignee: Hong Kong Productivity Council, Hong Kong (HK)

( * ) Notice: Subject to any disclaimer, the term of this patent is extended or adjusted under 35 U.S.C. 154(b) by 21 days.

(21) Appl. No.: 13/335,029

(22) Filed: Dec. 22, 2011

(65) Prior Publication Data

US 2013/0161921 A1    Jun. 27, 2013

(51) Int. Cl.
*B60G 11/14* (2006.01)

(52) U.S. Cl.
USPC .................................................. 280/124.179

(58) Field of Classification Search
USPC .............. 280/5.5, 5.507, 5.513, 5.514, 5.515, 280/6.157, 124.164, 124.179; 701/38–40
See application file for complete search history.

(56) References Cited

U.S. PATENT DOCUMENTS

| | | | |
|---|---|---|---|
| 4,892,328 A * | 1/1990 | Kurtzman et al. | 280/5.507 |
| 4,960,290 A * | 10/1990 | Bose | 280/124.162 |
| 4,981,309 A * | 1/1991 | Froeschle et al. | 280/6.157 |
| 5,678,847 A | 10/1997 | Izawa et al. | |
| 6,354,607 B1 * | 3/2002 | Kawashima et al. | 280/5.511 |
| 6,471,018 B1 * | 10/2002 | Gordaninejad et al. | 188/267.1 |
| 7,275,750 B2 * | 10/2007 | Suchta et al. | 280/5.511 |
| 7,654,540 B2 * | 2/2010 | Parison et al. | 280/5.5 |
| 7,962,261 B2 * | 6/2011 | Bushko et al. | 701/37 |
| 2008/0121444 A1 * | 5/2008 | Bauer | 180/65.1 |
| 2009/0121444 A1 * | 5/2009 | Bushko et al. | 280/5.507 |
| 2009/0178892 A1 * | 7/2009 | Lamers et al. | 188/267 |

OTHER PUBLICATIONS

Ismenio Martins et al., "Permanent-Magnets Linear Actuators Applicability in Automobile Active Suspensions", IEEE Transactions on Vehicular Technology, vol. 55, No. 1, Jan. 2006, 9 pgs.
Bart L. J. Gysen et al., "Design Aspects of an Active Electromagnetic Suspension System for Automotive Applications", IEEE Transactions on Industry Applications, vol. 45, No. 5, Sep./Oct. 2009, 9 pgs.

* cited by examiner

*Primary Examiner* — Faye M Fleming
*Assistant Examiner* — Robert A Coker
(74) *Attorney, Agent, or Firm* — Kolisch Hartwell, P.C.

(57) ABSTRACT

An active suspension system suitable for use with a vehicle, includes a passive suspension element with a first end adapted for rigid engagement to a sprung mass of the vehicle and a second end adapted for rigid engagement to an unsprung mass of the vehicle. Also included is an active suspension element with a linear switched reluctance actuator which has a first end adapted for rigid engagement to the sprung mass of the vehicle and a second end adapted for rigid engagement to the unsprung mass of the vehicle.

31 Claims, 14 Drawing Sheets

ACTIVE SUSPENSION SYSTEM AND METHOD

TECHNICAL FIELD

The present invention relates to the field of suspension systems and methods.

BACKGROUND OF THE INVENTION

Vehicle suspension systems are designed to absorb or isolate the passenger-carrying body of the vehicle from road shocks arising from irregularities in the road and to provide continuous contact between the wheels of the vehicle and the road in order to maximize passenger comfort, safety and road handling.

Passive suspension systems consisting of mechanical springs and dampers often fail to meet the above objectives due to the tendency of mechanical springs being either too hard or too soft resulting in insufficient or excessive movement of the passenger-carrying compartment respectively in response to road shocks. Passive suspension systems also cannot produce active forces rapidly to absorb road shocks and therefore undesirable pitch and roll motions of the passenger-carrying compartment cannot be properly suppressed.

Active suspension systems, which typically comprise hydraulic or electromagnetic actuators, provide improved performance over passive suspension systems but still exhibit deficiencies of their own. Hydraulic active suspension systems for instance include an array of components such as electric controllers, oil/air pumps and oil/air tanks forming relatively complex structures which must be carefully assembled and calibrated to operate properly. Accordingly, the production time and costs are relatively high. Furthermore, hydraulic systems tend to have low dynamic response and low reliability due to oil/air leakage and other faults which necessitate regular ongoing maintenance.

Electromagnetic active suspension systems based on permanent-magnet actuators suffer from similar problems as those of hydraulic type systems in terms of the complexity of their structures and components which exacerbates production costs. Additionally, the reliability in performance of existing electromagnetic active suspension systems is adversely affected by the tendency of the permanent magnets to demagnetise over time.

The above-described deficiencies in existing suspension systems compromises passenger ride comfort and safety and there is a perceived need to address such problems.

SUMMARY OF THE INVENTION

The present invention seeks to alleviate at least one of the above-described problems described in respect to the existing art.

The present invention may involve several broad forms. Embodiments of the present invention may include one or any combination of the different broad forms herein described.

In a first broad form, the present invention provides an active suspension system suitable for use with a vehicle, the active suspension system including:
 a passive suspension element having a first end adapted for rigid engagement to a sprung mass of the vehicle and a second end adapted for rigid engagement to an unsprung mass of the vehicle, the passive suspension element being configured for applying a passive force to the sprung mass; and an active suspension element including a linear switched reluctance actuator having a first end adapted for rigid engagement to the sprung mass of the vehicle and a second end adapted for rigid engagement to the unsprung mass of the vehicle wherein the linear switched reluctance actuator is configured for applying an active force to the sprung mass to substantially maintain a predetermined vertical orientation of the sprung mass when the vehicle traverses a road irregularity.

Preferably the passive suspension element may include a coil spring.

Preferably the passive suspension element and the linear switched reluctance actuator may be configured for engagement in parallel between the sprung mass and the unsprung mass.

Preferably the linear switched reluctance actuator may include:
 a frame having a peripheral wall, a top surface and a base defining a frame chamber;
 a stator rigidly positioned within the frame chamber;
 a translator positioned adjacent the stator within the frame chamber, the translator being configured for electromagnetic engagement with the stator to enable slidable movement of the translator relative to the stator; and
 a translator shaft rigidly engaged to and slidable with the translator for applying the active force to the sprung mass.

Typically,
 the top surface of the frame includes an opening and the base of the frame is configured for rigid engagement to the unsprung mass;
 the translator shaft includes a first end extending outwardly of the opening in the top surface of the frame, the first end of the translator shaft being configured for rigid engagement to the sprung mass and the translator shaft includes an opposed second end enclosed within the frame chamber, the second end of the translator shaft having a recess disposed therein;
 the first end of the coil spring is rigidly engaged to the translator shaft within the recess and the second end of the coil spring is rigidly engaged to the base of the frame wherein the coil spring is able to stretch and compress in axial alignment with the translator shaft.

Alternatively,
 an opening is disposed in the top surface of the frame and the base of the frame is configured for rigid engagement to the unsprung mass;
 the translator shaft includes a hollow chamber between a first and second end of the translator shaft, the first end of the translator shaft extending outwardly of the opening in the top surface of the frame wherein it is configured for rigid engagement to the sprung mass, an opposed second end of the translator shaft enclosed within the frame chamber, the second end of the translator shaft having an opening disposed therein leading into the hollow chamber of the translator shaft;
 the coil spring is disposed within the hollow chamber of the translator shaft wherein a first end of the coil is rigidly engaged to the first end of the translator shaft and the second end of the coil spring is rigidly engaged to the base of the frame by an elongate support member wherein the coil spring is able to stretch and compress in axial alignment with the translator shaft within the hollow chamber of the translator shaft.

Yet alternatively, an opening is disposed in the top surface of the frame and the base of the frame is configured for rigid engagement to the unsprung mass;

the translator shaft includes a first end extending outwardly of the opening in the top surface of the frame wherein it is configured for rigid engagement to the sprung mass and an opposed second end enclosed within the frame chamber, the second end of the translator shaft being rigidly engaged to the base;

the coil spring is positioned externally of the frame chamber, a first end of the coil spring surrounds the peripheral wall of the frame and abuts against a flanged section extending outwardly from the peripheral wall of the frame, a second end of the coil spring is rigidly engaged to the base of the frame wherein the coil spring is able to stretch and compress in axial alignment with the translator shaft externally of the frame chamber.

Preferably, the stator may be rigidly engaged to an inner surface of the peripheral wall within the frame chamber.

Preferably, the present invention includes a plurality of stators and a plurality of corresponding translators wherein said plurality of translators are rigidly engaged to the translator shaft.

Typically the stator may include a double-sided stator. Alternatively, the translator may include a single-sided stator.

Preferably, the present invention includes a controller unit configured for regulating phased currents provided to phased windings of the linear switched reluctance actuator in order to control the active force applied by the linear switched reluctance actuator to the sprung mass.

Preferably, the present invention includes a sensor circuit configured for providing input sensor readings to the controller unit, the sensor readings being indicative of at least one of a linear displacement of the translator relative to the stator, a vertical acceleration of the sprung mass, and a vertical acceleration of the unsprung mass, wherein the controller unit regulates the phased currents provided to the phased windings by reference to the sensor readings.

Preferably the phased windings may be disposed on the stator.

Preferably the coil spring may be configured for absorbing vertical motion energy induced in the sprung mass when the vehicle traverses the road irregularity and the linear switched reluctance actuator is configured for dampening the absorbed vertical motion energy by at least one of dissipating the absorbed vertical motion energy and storing the absorbed vertical motion energy in an energy store.

Preferably the present invention includes a bi-directional power interface disposed between the controller unit and the linear switched reluctance actuator whereby movement of the translator shaft is able to be converted into energy suitable for storage in the energy store via the bi-directional power interface.

Preferably the energy store includes a battery of the vehicle.

In a second broad form, the present invention provides a method of providing active suspension system suitable for use with a vehicle, the method including the steps of:

providing a passive suspension element having a first end adapted for rigid engagement to a sprung mass of the vehicle and a second end adapted for rigid engagement to an unsprung mass of the vehicle, the passive suspension element being configured for applying a passive force to the sprung mass; and providing an active suspension element including a linear switched reluctance actuator having a first end adapted for rigid engagement to the sprung mass of the vehicle and a second end adapted for rigid engagement to the unsprung mass of the vehicle wherein the linear switched reluctance actuator is configured for applying an active force to the sprung mass to substantially maintain a predetermined vertical orientation of the sprung mass when the vehicle traverses a road irregularity.

Preferably the passive suspension element may include a coil spring.

Preferably, the present invention may include a step of engaging the passive suspension element and the linear switched reluctance actuator in parallel between the sprung mass and the unsprung mass.

Preferably the linear switched reluctance actuator may include:

a frame having a peripheral wall, a top surface and a base defining a frame chamber;

a stator rigidly positioned within the frame chamber;

a translator positioned adjacent the stator within the frame chamber, the translator being configured for electromagnetic engagement with the stator to enable slidable movement of the translator relative to the stator; and a translator shaft rigidly engaged to and slidable with the translator for applying the active force to the sprung mass.

Typically, the top surface of the frame includes an opening and the base of the frame is configured for rigid engagement to the unsprung mass;

the translator shaft includes a first end extending outwardly of the opening in the top surface of the frame, the first end of the translator shaft being configured for rigid engagement to the sprung mass and the translator shaft includes an opposed second end enclosed within the frame chamber, the second end of the translator shaft having a recess disposed therein;

the first end of the coil spring is rigidly engaged to the translator shaft within the recess and the second end of the coil spring is rigidly engaged to the base of the frame wherein the coil spring is able to stretch and compress in axial alignment with the translator shaft.

Alternatively, an opening is disposed in the top surface of the frame and the base of the frame is configured for rigid engagement to the unsprung mass;

the translator shaft includes a hollow chamber between a first and second end of the translator shaft, the first end of the translator shaft extending outwardly of the opening in the top surface of the frame wherein it is configured for rigid engagement to the sprung mass, an opposed second end of the translator shaft enclosed within the frame chamber, the second end of the translator shaft having an opening disposed therein leading into the hollow chamber of the translator shaft;

the coil spring is disposed within the hollow chamber of the translator shaft wherein a first end of the coil is rigidly engaged to the first end of the translator shaft and the second end of the coil spring is rigidly engaged to the base of the frame by an elongate support member wherein the coil spring is able to stretch and compress in axial alignment with the translator shaft within the hollow chamber of the translator shaft.

Yet alternatively, an opening is disposed in the top surface of the frame and the base of the frame is configured for rigid engagement to the unsprung mass;

the translator shaft includes a first end extending outwardly of the opening in the top surface of the frame wherein it is configured for rigid engagement to the sprung mass and an opposed second end enclosed within the frame chamber, the second end of the translator shaft being rigidly engaged to the base;

the coil spring is positioned externally of the frame chamber, a first end of the coil spring surrounds the peripheral wall of the frame and abuts against a flanged section extending outwardly from the peripheral wall of the frame, a second end of the coil spring is rigidly engaged to the base of the frame wherein the coil spring is able to stretch and compress in axial alignment with the translator shaft externally of the frame chamber.

Preferably, the present invention may include a step of rigidly engaging the stator to an inner surface of the peripheral wall within the frame chamber.

Preferably, the present invention may include a step of providing a plurality of stators and a plurality of corresponding translators wherein said plurality of translators are rigidly engaged to the translator shaft.

Typically, the stator may include a double-sided stator. Alternatively, the translator may include a single-sided stator.

Preferably, the present invention may include a controller unit configured for regulating phased currents provided to phased windings of the linear switched reluctance actuator in order to control the active force applied by the linear switched reluctance actuator to the sprung mass.

Preferably, the present invention may include a step of providing the controller unit with input sensor readings from a sensor circuit, the sensor readings being indicative of at least one of a linear displacement of the translator relative to the stator, a vertical acceleration of the sprung mass, and a vertical acceleration of the unsprung mass, wherein the controller unit regulates the phased currents provided to the phased windings by reference to the sensor readings.

Preferably, the present invention may include a step of arranging the phased windings on the stator.

Preferably, the coil spring may be configured for absorbing vertical motion energy induced in the sprung mass when the vehicle traverses the road irregularity and the linear switched reluctance actuator is configured for dampening the absorbed vertical motion energy by at least one of dissipating the absorbed vertical motion energy and storing the absorbed vertical motion energy in an energy store.

Preferably, the present invention may include a step of providing a bi-directional power interface between the controller unit and the linear switched reluctance actuator whereby movement of the translator shaft is able to be converted into energy suitable for storage in the energy store via the bi-directional power interface.

Preferably, the present invention may include a step of storing the energy in a battery of the vehicle.

Advantageously, the present invention provides improved dynamic performance over passive and hydraulic suspension systems as the controller unit is able to rapidly regulate movement of the linear switched actuator to provide active forces in response to sensed road irregularities which are suitably precise to alleviate pitch and roll motions and to keep the wheels in contact with the ground surface.

Advantageously, the present invention provides more reliable operation than existing hydraulic-based systems due to the lack of need for oil/air pumps, tanks and other components which are susceptible to leakage problems and require ongoing maintenance. The present invention may also be more reliable than existing electromagnetic suspension systems utilising permanent magnets because there is no problem with demagnetisation of the permanent magnets which compromises performance. Also, no phased windings are disposed on the translator projections which alleviates weight being unduly placed on the translator and translator shaft in use. Also, the phased windings on the stator projections may be electrically isolated from each other to provide higher fault tolerance.

Also advantageously, the present invention provides a relatively simpler structure and fewer components compared to hydraulic and permanent-magnet based systems. Accordingly, the present invention may be cheaper to manufacture particularly in mass production. It is also more efficient to produce due to the simplicity of its structure, the relatively few components, and the relatively simple interconnections between the component parts.

Linear switched reluctance actuators are relatively robust and suitable for use in high temperatures and harsh operating environments so as to provide versatility in application.

Yet also, the present invention provides improved energy efficiency over existing systems due to the ability to regenerate energy. When the linear switched reluctance actuator is not in "motoring" mode (i.e. applying active forces to the sprung mass) movement of the translator in "generating" mode in response to vertical motion energy of the vehicle, may be converted by any number of known transducer circuitry to a form of energy suitable for storage in the vehicle battery via the bi-directional power flow interface disposed between the linear switched reluctance actuator and the control unit. This lends itself particularly well to use in Electric Vehicles, hybrid electric vehicles.

BRIEF DESCRIPTION OF THE DRAWINGS

The present invention will become more fully understood from the following detailed description of a preferred but non-limiting embodiment thereof, described in connection with the accompanying drawings, wherein.

PREFERRED EMBODIMENTS OF THE PRESENT INVENTION

Figure 1:
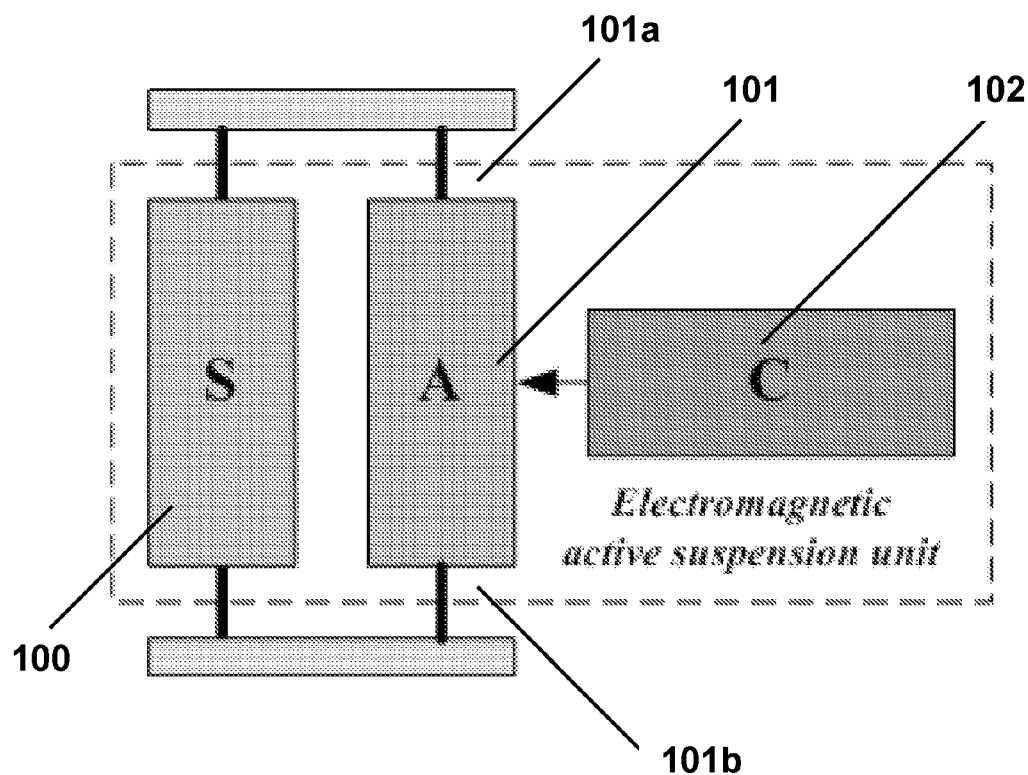
FIG. 1 shows a functional block diagram of an electromagnetic active suspension unit in accordance with an embodiment of the present invention.

Preferred embodiments of the present invention will now be described with reference to FIGS. 1 to 18. The preferred embodiments include an electromagnetic active suspension unit which is suitable for use in providing active suspension in a vehicle. It would be readily understood by a person skilled in the art that alternative embodiments of the present invention may be suitably configured for use in other applications.

The electromagnetic active suspension unit includes a passive suspension element (100) adapted for operation in combination with an active suspension element (101). The passive suspension element (100) is configured for applying a passive force to a sprung mass of the vehicle and for absorbing vertical motion energy of the vehicle as a wheel of the vehicle traverses irregularities (e.g. sunken and raised sections) in a ground surface. The active suspension element (101) is configured to apply an active force to a sprung mass of the vehicle to alleviate uncomfortable pitch and roll movements as the wheel traverses the irregularities in the ground surface as well as to function as a damper in response to vertical motion energy absorbed from such irregularities.

The passive suspension element (100) in the preferred embodiments includes a coil spring (100) having a first end (100a) configured for rigid engagement to the sprung mass (102a) of the vehicle (e.g. the chassis) and a second end (100b) configured for rigid engagement to an unsprung mass (102b) of the vehicle (e.g. the wheel shaft) whereby it is able to provide a passive force to the sprung mass (102a). In response to irregularities in the ground surface, the coil spring (100) stretches or compresses to absorb vertical motion energy arising from the irregularities. The degree of "hardness" or "softness" of the coil spring (100) can be selected depending upon the type of vehicle involved, the intended load capacity, and the nature of the ground surface that will be traversed and will determine the amount of vertical motion energy that may be absorbed in traversing the ground surface irregularities.

The active suspension element (101) includes a linear switched reluctance actuator (101) having a first end (101a) which is configured for rigid engagement to the sprung mass (102a) and a second end (101 b) which is configured for rigid engagement to the unsprung mass (102b) whereby the linear switched reluctance actuator (101) is operable in parallel with the coil spring (100). Movement of the linear switched reluctance actuator (101) is regulated by a controller unit (102) so as to controllably apply the active force to the sprung mass (102a) to alleviate pitch and roll movements, and, to act as a damper by controllably dissipating or storing the absorbed vertical motion energy in the vehicle battery. Storage of the absorbed vertical motion energy is able to be achieved by virtue of a bi-directional power interface (111) disposed between the controller unit (102) and the linear switched reluctance actuator (101).

FIG. 1 shows a schematic diagram of an electromagnetic active suspension unit in stand-alone fashion in which the coil spring (100) is arranged in parallel with the linear switched reluctance actuator (101). The controller unit (102) is also shown which regulates the active force and damping force applied by the electromagnetic active suspension unit in use.

Figure 2:
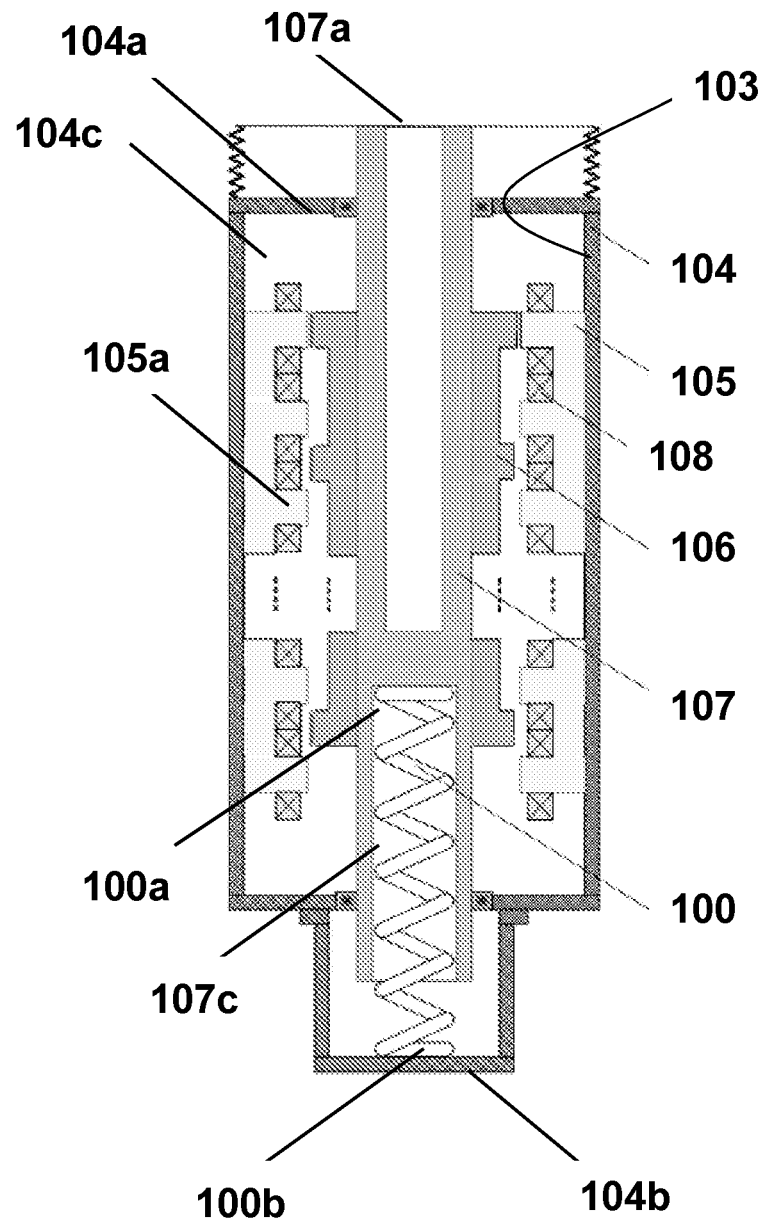
FIG. 2 shows a first exemplary configuration of a coil spring in relation to a linear switched reluctance actuator in the electromagnetic active suspension system in accordance with an embodiment of the present invention.
Figure 3:
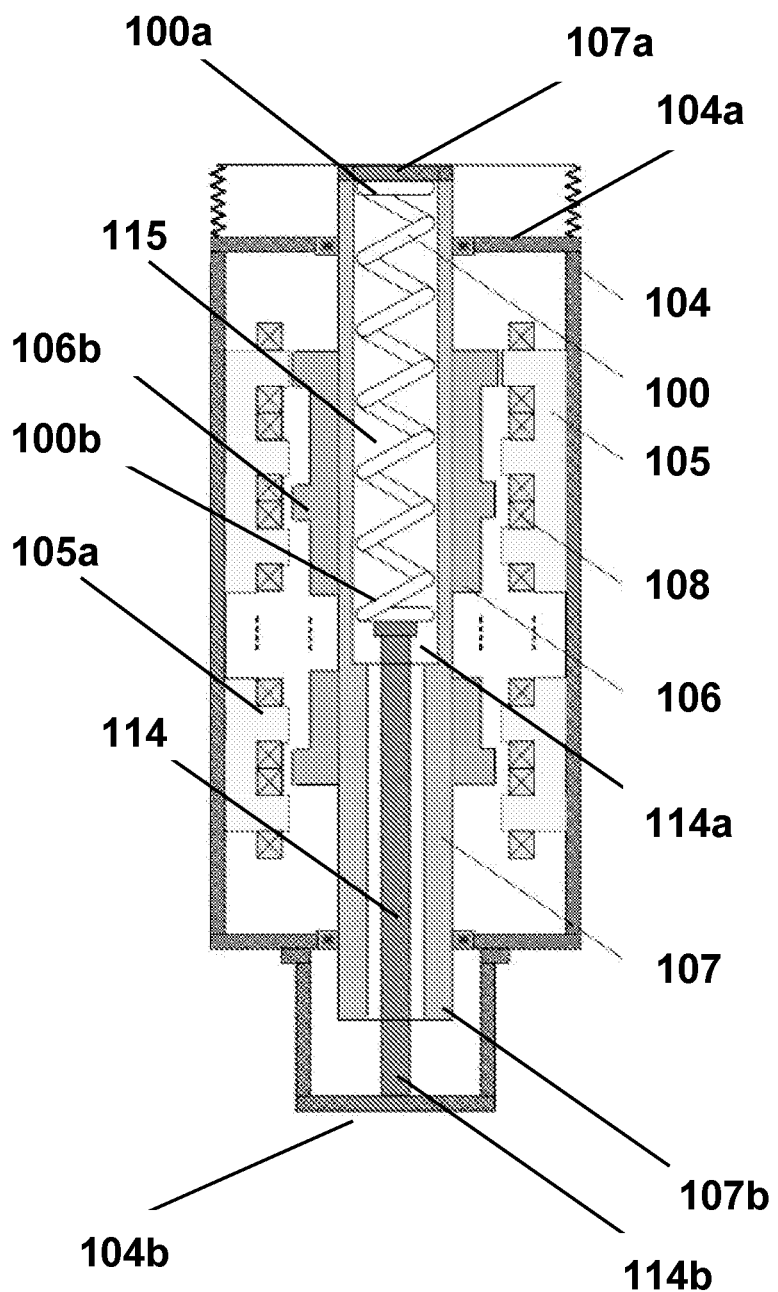
FIG. 3 shows a second exemplary configuration of a coil spring in relation to a linear switched reluctance actuator of the electromagnetic active suspension system in accordance with an embodiment of the present invention.
Figure 4:
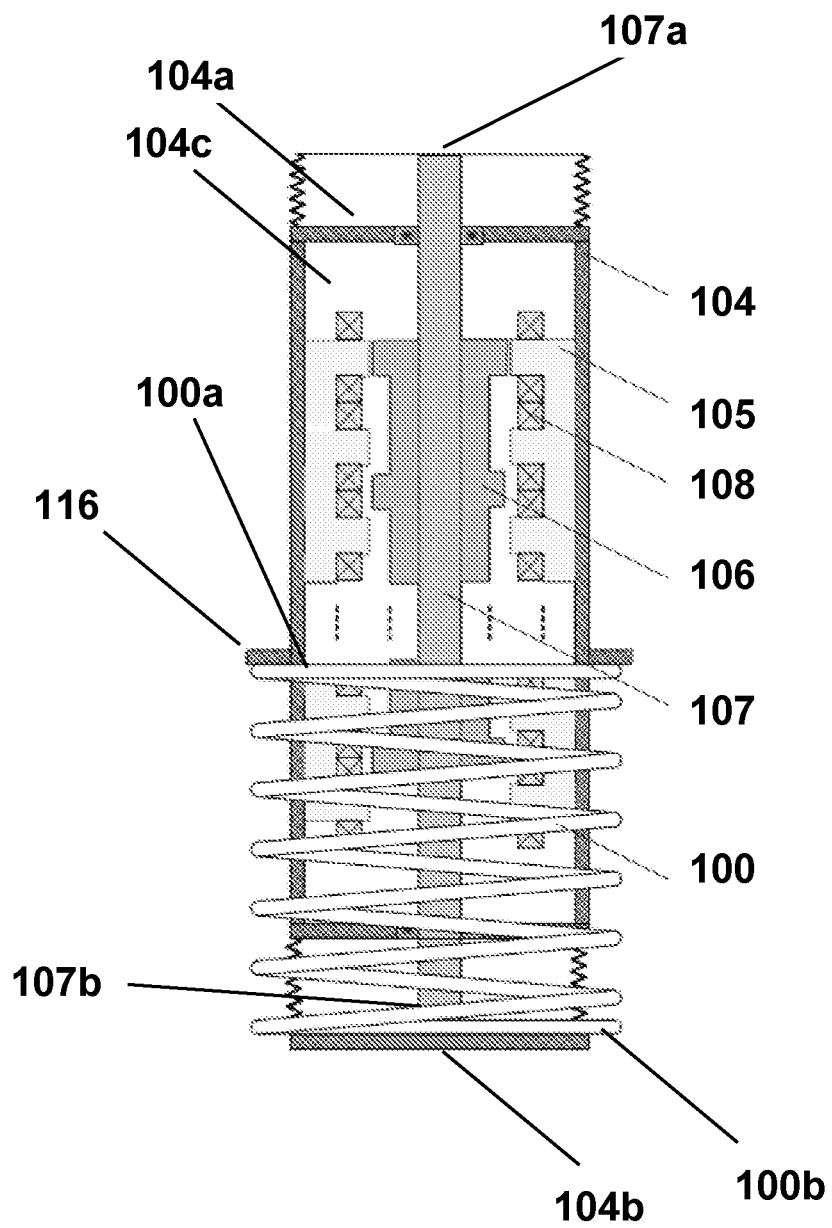
FIG. 4 shows a third exemplary configuration of a coil spring in relation to a linear switched reluctance actuator of the electromagnetic active suspension system in accordance with an embodiment of the present invention.

With reference to FIGS. 2 to 4, the linear switched reluctance actuator (101) is shown in further detail including a frame (104), a stator (105), a translator (106), a translator shaft (107) and a sensor circuit (109). The frame (104) includes a peripheral wall (103), a top surface (104a) and a base (104b) which collectively define a frame chamber (104c).

The stator (105) is rigidly engaged to an inner wall (103) of the frame (104) whereby it is arranged adjacent the translator (106). Within the frame chamber (104c). The translator (106) is adapted for slidable movement relative to the stator (105) in accordance with principles of operation which will be described in further detail below. The translator (106) is rigidly engaged to the translator shaft (107) such that slidable movement of the translator (106) relative to the stator (105) results in telescopic movement of the translator shaft (107) relative to the frame (104) via an opening(s) in the top surface (104a) and/or base (104b) of the frame (104).

Preferred embodiments of the present invention include 4 stators (105) configured for electromagnetic engagement with 4 corresponding translators (106). Each of the 4 translators (106) are uniformly spaced around the translator shaft (107) and rigidly engaged to the translator shaft (107). It would be understood by a person skilled in the art that in alternative embodiments, the number of stators and corresponding translators utilised may vary depending upon the specific nature of the application and relevant design choices. For ease of understanding of the operation of embodiments of the present invention reference will hereafter only be made to operation of a single stator (amongst the 4 stators) in relation to a single translator (amongst the 4 corresponding translators).

In the preferred embodiments, the linear switched reluctance actuator (101) and coil spring (100) are configured for engagement in parallel between the sprung mass (102a) and the unsprung mass (102b) in accordance with several different configurations as depicted in FIGS. 2 to 4.

FIG. 2 shows a first exemplary configuration in which a first end (100a) of the coil spring (100) is arranged inside of a hollow region (107c) of the translator shaft (107). A second end (100b) of the coil spring (100) is arranged outside of the translator shaft (107). A top end (107) of the translator shaft (107) is configured for rigid engagement to the sprung mass (102a) whilst a bottom end of the translator shaft (107b) is rigidly engaged to a top end (100a) of the coil spring (100). A bottom end (100b) of the coil spring (100) is rigidly engaged to a base (104b) of the frame (104) which in turn is rigidly engaged to the unsprung mass (102b). In this configuration, telescopic movement of the translator shaft (107) in a downward direction towards the base (104b) of the frame (104) results in compression of the coil spring (100). Conversely, telescopic movement of the translator shaft (107) in an upward direction outwardly of a hole in the top surface (104a) of the frame (104) results in stretching of the coil spring (100).

FIG. 3 shows a second exemplary configuration in which the coil spring (100) is arranged inside a hollow region (115) of the translator shaft (107) with a top end (100a) of the coil spring (100) being rigidly engaged to a top end (107a) of the translator shaft (107). The top end (107a) of the translator shaft (107) is also configured for rigid engagement to the sprung mass (102a) of the vehicle. A bottom end of the coil spring (100b) is rigidly engaged to a top end (114a) of a support member (114) consisting of an elongate rigid metal rod. A bottom end (114b) of the support member (114) is rigidly engaged to the base (104b) of the frame (104) which in turn is configured for rigid engagement to the unsprung mass (102b). In this configuration, telescopic movement of the translator shaft (107) in a downward direction towards the base (104b) of the frame (104) results in compression of the coil spring (100) between the top end (107a) of the translator shaft (107) and the top end (114a) of the support member (114). Conversely, telescopic movement of the translator shaft (107) in an upward direction outwardly of the hole in the top surface (104a) of the frame (104) results in stretching of the coil spring (100) within the hollow region (115) of the translator shaft (107).

FIG. 4 shows a third exemplary configuration in which the coil spring (100) is arranged externally of the frame (104). An opening is disposed in the top surface of the frame (104) via which the translator shaft (107) is able to telescopically extend therethrough relative to the frame (104). A top end (107a) of the translator shaft (107) extends outwardly of the hole in the top surface (104a) of the frame (104) and is configured for rigid engagement to the sprung mass (102a). The bottom end (107b) of the translator shaft (107) is rigidly engaged to the base (104b) of the frame (104) which in turn is configured for rigid engagement to the unsprung mass (102b). A top terminal (100a) of the coil spring (100) is rigidly engaged to, and upwardly abuts against, a lower surface of a flanged outer section (116) of the frame (104). A bottom end (100b) of the coil spring (100) is configured for rigid engagement with the bottom end of the translator shaft (107b), the base (104b) of the frame (104) and the unsprung mass (102b). In this configuration, telescopic movement of the translator shaft (107) in a downward direction towards the base (104b) of the frame (104) results in compression of the coil spring (100) between the flanged outer section (116) of the frame (104) and the unsprung mass (102b). Conversely, telescopic movement of the translator shaft (107) in an upward direction outwardly of the hole in the top surface (104a) of the frame (104) results in stretching of the coil spring (100).

Figure 6:
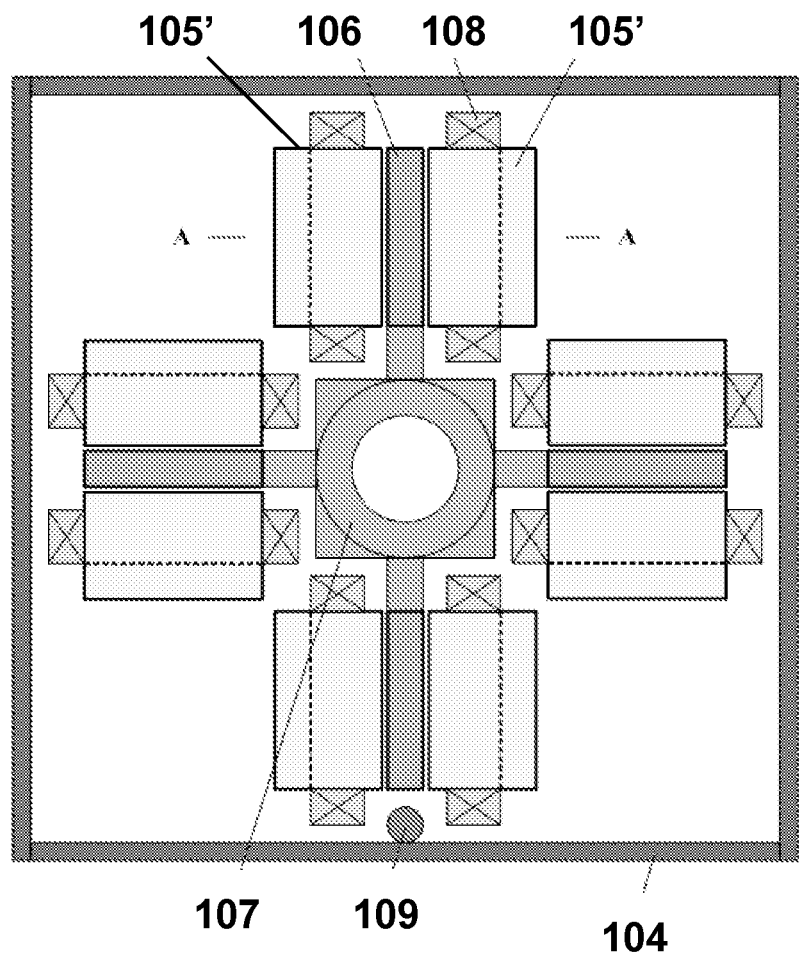
FIG. 6 shows a first topological layout of a linear switched reluctance actuator of the electromagnetic active suspension unit including a double-sided stator operating with a translator in accordance with an embodiment of the present invention.
Figure 7:
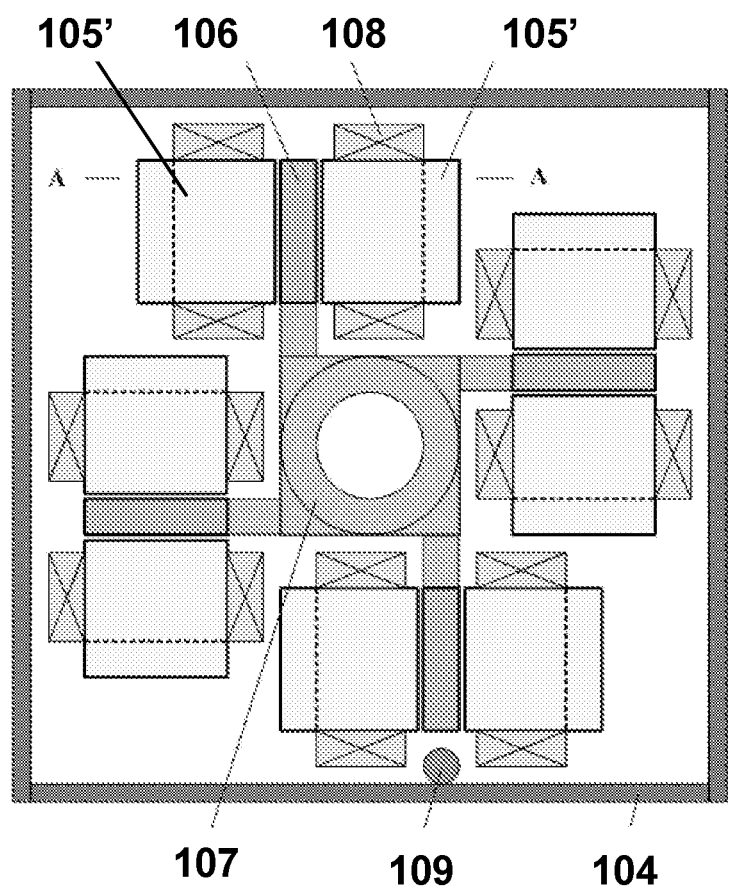
FIG. 7 shows a second topological layout of a linear switched reluctance actuator of the electromagnetic active suspension unit including a double-sided stator operating with a translator in accordance with an embodiment of the present invention.
Figure 9:
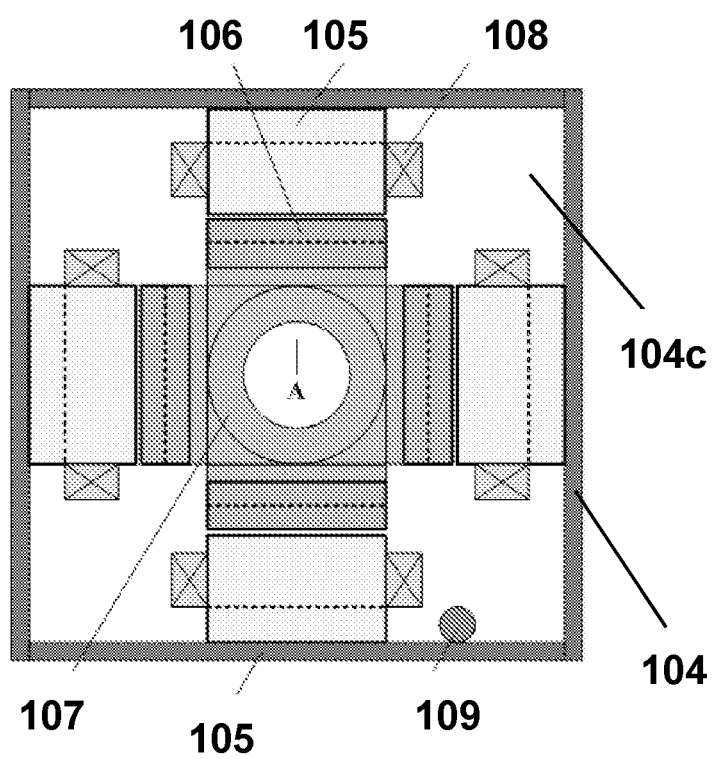
FIG. 9 shows a third topological layout of a linear switched reluctance actuator of the electromagnetic active suspension unit including a single-sided stator operating with a translator in accordance with an embodiment of the present invention.

As shown in the topological layouts of FIGS. 6, 7 and 9, the peripheral wall (103) of the frame (104) defines a rectangular-shaped cross-section. It would be appreciated by persons skilled in the art that other cross-sectional shape configurations of the frame may be utilised including a cylindrical shaped frame.

The operation of the linear switched reluctance actuator (101) will now be described in greater detail with particular reference to FIGS. 5, 8 and 10 to 12. The translator (106) and stator (105) both include substantially elongate configurations adjacently positioned in parallel to each other and separated by an air gap. In operation, the translator (106) and stator (105) are configured for electromagnetic engagement with each other by the controller unit (102) whereby the translator (106) and translator shaft (107) are able to be controllably moved relative to the stator (105) to apply the active force, as will be described in further detail below.

The translator (106) and stator (105) are formed from a plurality of thin metal strips or laminations, bonded or fastened together to a desired thickness. By way of example, laminated silicon steel is used in the preferred embodiments.

Figure 5:
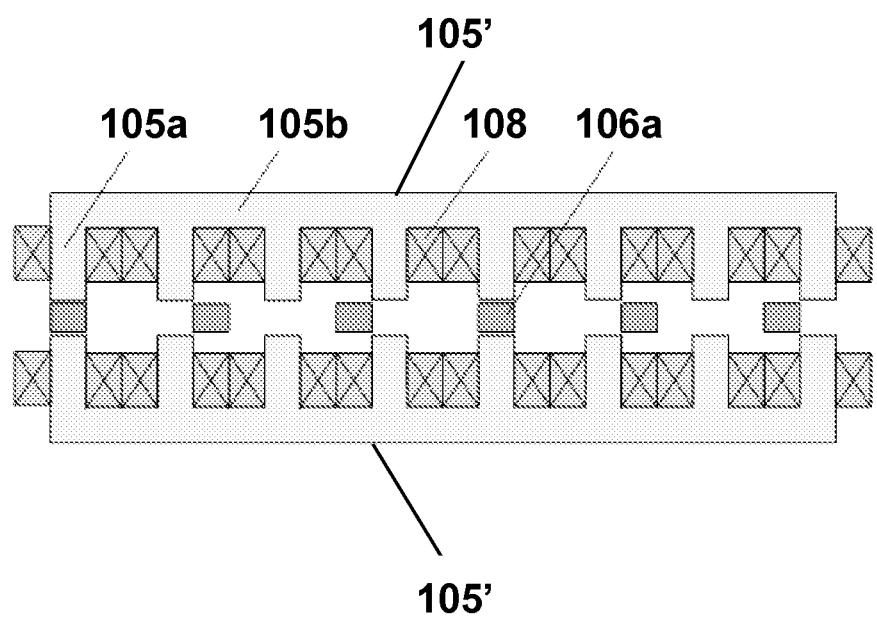
FIG. 5 shows a first exemplary configuration of a stator in relation to a translator of the linear switched reluctance actuator of the electromagnetic active suspension unit in accordance with an embodiment of the present invention wherein the stator is double-sided.
Figure 8:
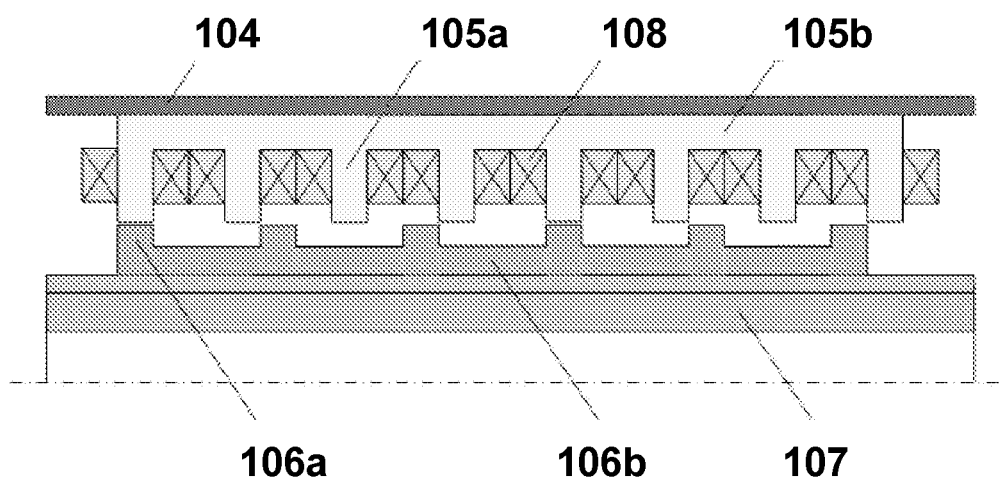
FIG. 8 shows a second exemplary configuration of a stator in relation to a translator of the linear switched reluctance actuator of the electromagnetic active suspension unit in accordance with an embodiment of the present invention wherein the stator is single-sided and the translator includes a yoke.

In the preferred embodiments, the stator (105) can be implemented as either a double-sided structure as shown in FIG. 5 having a pair of stator elements (105') disposed on opposing sides of the translator (106), or, as a single-sided stator as shown in FIG. 8 having a single stator element positioned adjacent the translator (106).

Referring to the double-sided stator, the pair of stator elements (105') include substantially symmetrical shapes and configurations which cooperatively define a magnetic flux path with the translator (106) in use to effect movement of the translator (106). In this configuration, a translator yoke may not be required. FIGS. 6 and 7 show two alternative topological layouts of configurations of the linear switched reluctance actuator in which a double-sided stator is utilised in relation to a corresponding translator.

In the case of a single-sided stator, the translator (106) includes a yoke (106b) as shown in the exemplary configuration depicted in FIG. 8 which in use forms part of a magnetic flux path with the stator (105). A topological layout of the single-sided stator in relation to the translator (106) within an exemplary linear switched reluctance actuator (101) is shown in FIG. 9.

For ease of understanding the operation of the linear switched reluctance actuator (101) in the context of the embodiments of the present invention, the description will hereafter refer to use of a double-sided stator in relation to the corresponding translator (106). Each stator element (105') of the stator (105) includes a stator yoke (105b) from which extends a plurality of integrally formed and uniformly-spaced projections (105a). As will become apparent, the stator projections (105a) are adapted to produce electromagnetic poles in use when energized by phased currents provided by the controller unit (102). The translator (106) also includes a plurality of uniformly-spaced projections (106a) which are configured to act as salient magnetic poles by way of magnetic reluctance, in use.

In the preferred embodiments, the number of stator projections (105a) and the number of translator projections (106a) are each an integer greater than two. By way of example, both the stator (105) and the translator (106) each include eight projections as shown in FIGS. 10(a) to 10(e)—that is, each of the stator elements (105') of the double-sided stator includes eight projections. The number of stator and translator projections may be varied and the number of stator projections (105a) need not be equal to the number of translator projections (106a). It may for instance be desirable to have a fewer number of translator projections (106a) than the number of stator projections (105a) in certain applications Phased windings (108) are disposed around each of the stator projections (105a) and are electrically connected to the controller unit (102) which is configured to energize the phased windings (108) with phased currents so as to produce magnetic poles on the stator projections (105a). The positioning of the phased windings (108) on the stator projections (105a) and not on the translator projections (106a) is advantageous in alleviating weight being placed on the translator (106) and translator shaft (107) during operation.

The controller unit (102) is configured for energising the phased windings (108) with phased currents in accordance with a pre-defined sequence. In doing so, a pattern of time-varying magnetic flux propagated through the magnetic poles of the stator (105) generates magnetic forces which causes the translator (106) and translator shaft (107) to slidably move relative to the stator (105) in a controlled manner. In particular, the translator (106) has a tendency to slidably move towards a position relative to the stator (105) in which the inductance of the energized stator phased windings (108) are maximized. Thus, by controlling movement of the translator shaft (107), a suitable active force can be applied to the sprung mass (102a) to alleviate pitch and roll movements of the sprung mass (102) and dampen absorbed vertical motion energy arising from irregularities in the ground surface.

Figure 11:
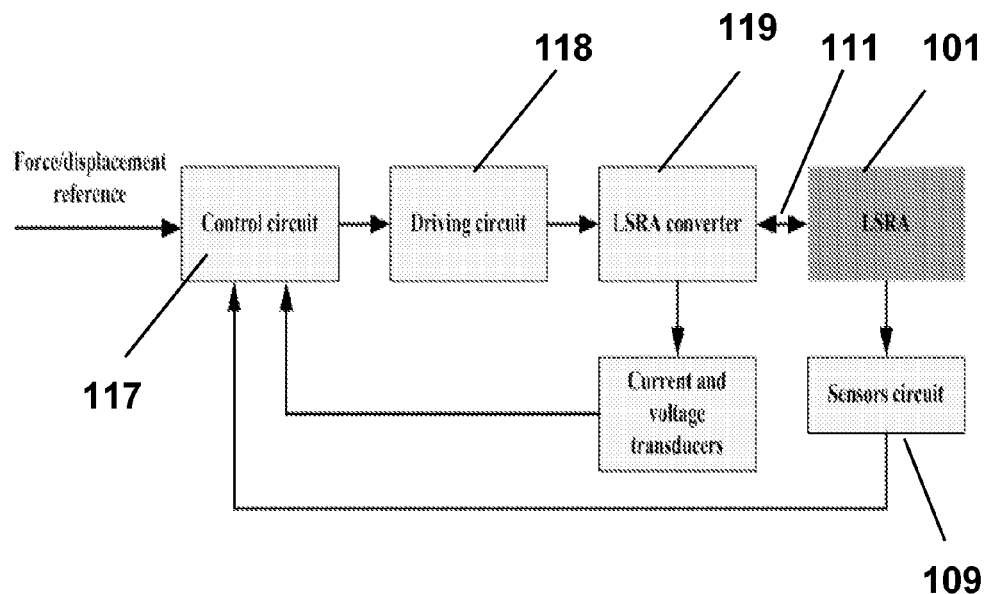
FIG. 11 shows a functional block diagram of a controller unit configured for use in accordance with an embodiment of the present invention.
Figure 12:
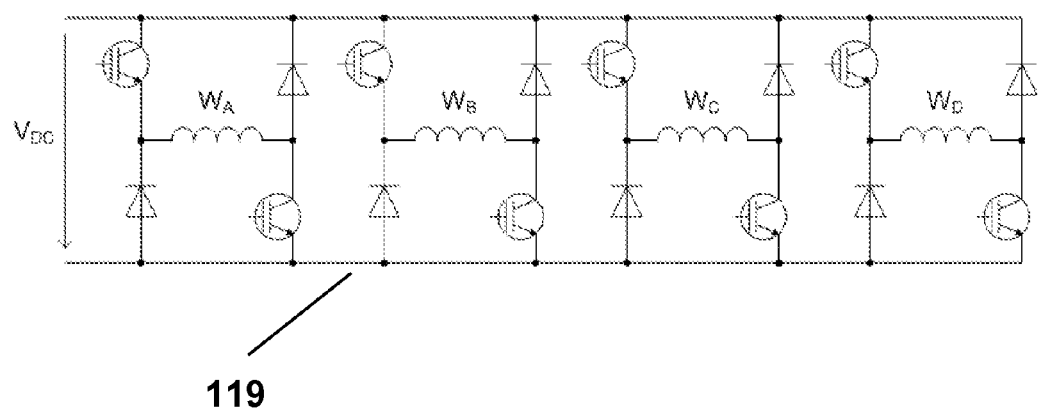
FIG. 12 shows a circuit diagram of a converter circuit in the controller unit configured for use in regulating operation of a 4-phase linear switched reluctance actuator in accordance with an embodiment of the present invention.

The controller unit (102) is configured to regulate the magnitude and waveform characteristics of phased currents applied to the phased windings (108) and thereby suitably control the active force and displacement provided by the translator shaft (107) as it moves during operation of the electromagnetic active suspension unit. FIG. 11 depicts a block diagram of an exemplary controller unit (102) whilst FIG. 12 depicts a schematic diagram of an exemplary 4-phase linear switched reluctance actuator converter circuit (119) configured for use in the preferred embodiments.

The control circuit (117) includes a microprocessor configured for receiving sensor inputs from a sensor circuit (109) indicative of a linear displacement of the translator relative to the stator, a vertical acceleration of the sprung mass, and a vertical acceleration of the unsprung mass at any given time.

The microprocessor is configured to execute an algorithm by reference to the received input sensor readings in order to determine a suitable active force to be applied to the sprung mass (102a). Thereafter, the controller unit (102) provides regulated phased currents having suitable magnitude and waveform characteristics to respective phased windings (108) of the stator projections (105a) via the driver (118) and converter circuits (119) so as to drive the translator shaft (107) and thereby apply the desired active force to the sprung mass (102a).

Figure 10:
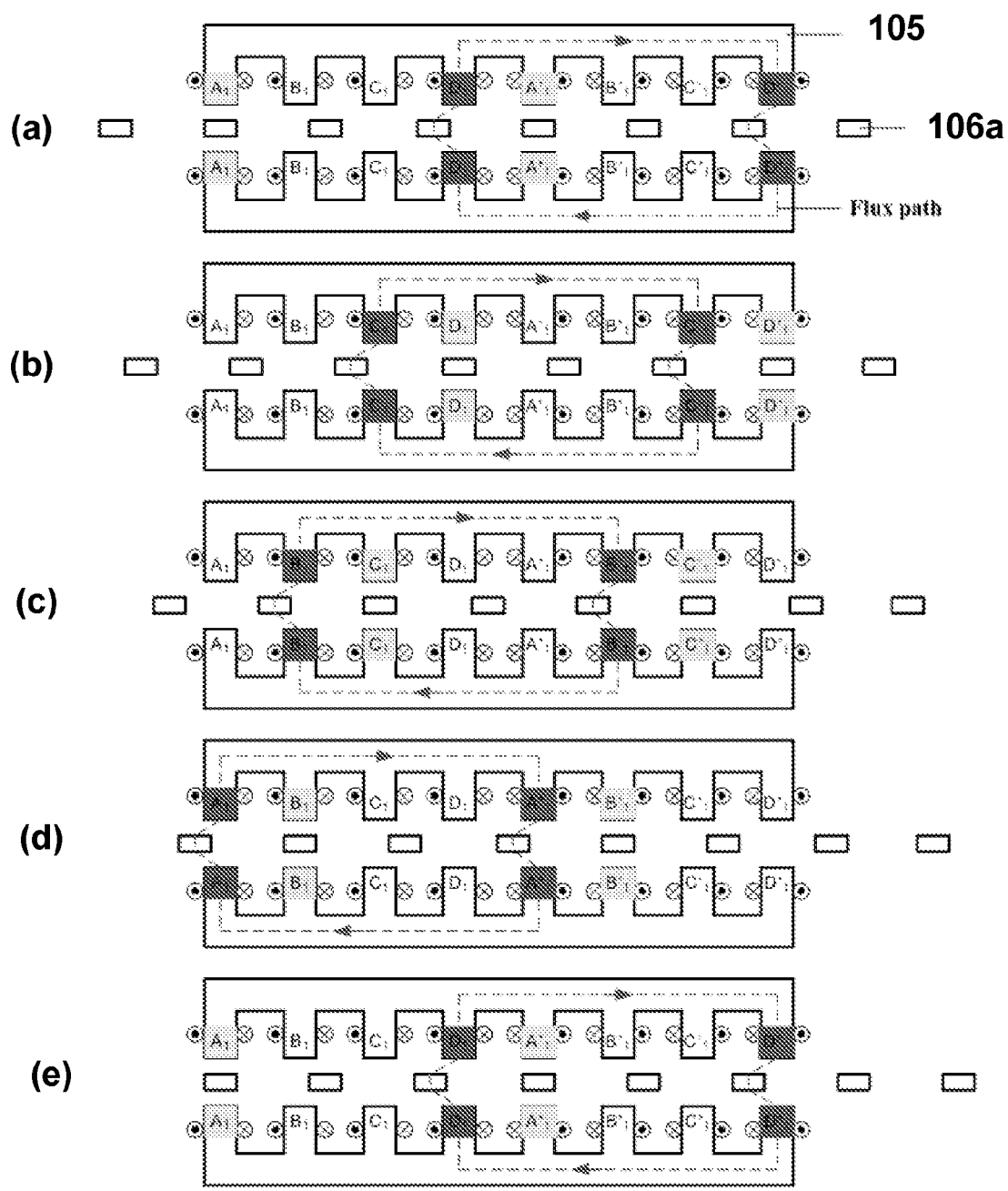
FIG. 10(a)-10(e) shows a schematic diagram of a 4-phase linear switched reluctance actuator in operation in which the translator is shown progressively moved from left to right relative to the stator in accordance with an embodiment of the present invention.

Referring to FIG. 10, movement of the translator (106) in a left-to-right direction by way of controlled sequential energising of the phased windings (108) of the 4-phase linear switched reluctance actuator (101) will now be described in further detail to illustrate operation of the linear switched reluctance actuator (101). The "cross" symbol and a "dot" symbol shown on the phased windings (108) in FIGS. 10(a) to 10(e) indicate the relative directions of phased currents entering and leaving the phased windings (108) respectively in this example as would be conventionally understood by a person skilled in the art.

The phased windings (108) of the 4 stator-phases of the linear switched reluctance actuator (101) are indicated in FIGS. 10(a)-10(e) by symbols A1-A1', B1-B1', C1-C1' and D1-D1'. The phased windings (108) in any given stator phase are connected in series and are therefore energized by a single phased current from the controller unit (102).

To commence movement of the translator (106) from left-to-right, the controller unit (102) is configured to first energize stator projections D1-D1' with phased currents. A resulting magnetic flux is produced having a path in a clockwise direction as indicated by the dashed-line arrow in FIG. 10(a). As shown in FIG. 10(a), when the stator projections D1-D1' are first energized, magnetic flux is produced along a path which passes through the unaligned translator projections immediately to the left of stator projections D1-D1'. In the fully unaligned position, the translator projections immediately to the left of stator projections D1-D1' provide maximum reluctance in the path of magnetic flux. After being energized, the magnetic flux produced by stator phase D1-D1' has a tendency to "pull" the unaligned translator projections immediately to the left in a direction towards an aligned position with the energized stator poles D1-D1' so as to provide minimum reluctance in the magnetic flux path. The translator projections are shown in FIG. 10(b) after being pulled into alignment with stator projections D1-D1' which are now de-energized.

Also in FIG. 10(b), stator phase C1-C1' is shown as being next energized by the controller unit in accordance with the pre-defined sequence as stator projections D1-D1' are de-energized. The translator projections now immediately to the left of stator projections C1-C1' in FIG. 10(b) are pulled from an unaligned position towards an aligned position relative to energized stator projections C1-C1' so as to minimize reluctance in the magnetic flux path. The translator projections are shown in FIG. 10(c) after being pulled into alignment with stator projections C1-C1' which are now de-energized.

Also in FIG. 10(c), stator phase B1-B1' is shown as being energized by the controller unit in accordance with the pre-defined sequence as stator projections C1-C1' are de-energized. The translator projections now immediately to the left of stator projections B1-B1' in FIG. 10(c) are further pulled from an unaligned position towards an aligned position relative to energized stator projections B1-B1' so as to minimize reluctance in the magnetic flux path. The translator projections are shown in FIG. 10(d) after being pulled into alignment with stator projections B1-B1' which are now de-energized.

Also in FIG. 10(d), stator phase A1-A1' is shown as being energized by the controller unit in accordance with the pre-defined sequence as stator projections B1-B1' are de-energized. The translator projections now immediately to the left of stator projections A1-A1 in FIG. 10(d) are further pulled from an unaligned position towards an aligned position relative to energized stator projections A1-A1' so as to minimize reluctance in the magnetic flux path. The translator projections are shown in FIG. 10(e) after being pulled into alignment with stator projections A1-A1' which are now de-energized.

As would be appreciated from the above example, the translator (106) can be "pulled" in slidable motion relative to the stator due to the controller unit controllably energising specific sets of stator projections in accordance with a pre-defined sequence. The translator (106) may similarly be slidably moved from right-to-left according to similar principles of operation except that the controller unit (102) is configured to energize the stator phases in reverse sequence and to apply suitably adjusted phased currents as would be understood by a person skilled in the art.

In alternative embodiments where the stator (105) includes a single stator element only as depicted in FIG. 8, the translator includes a translator yoke (106b) integrally formed with and connecting each of the translator projections (106a) in order to complete the path of magnetic flux propagating from the energized phased windings (108). The translator yoke (106b) assists in forming part of the magnetic flux path in cooperation with the single stator element.

Figure 13:
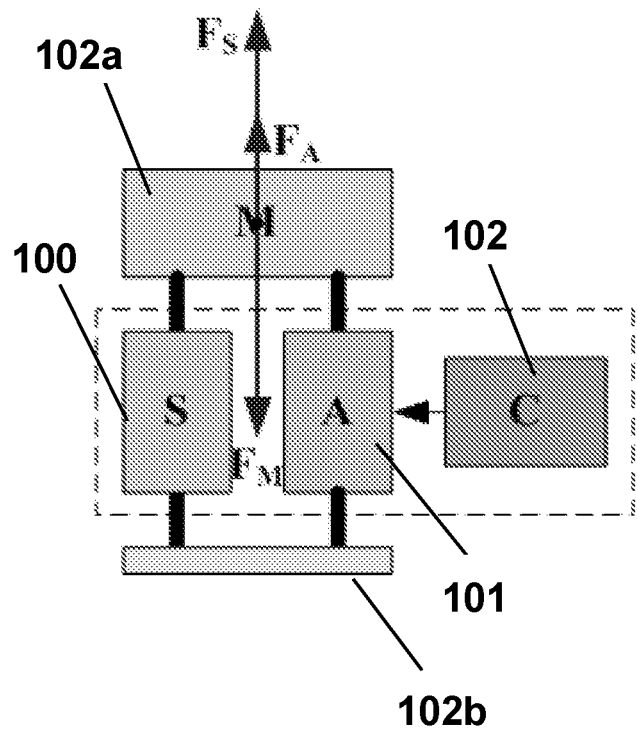
FIG. 13 shows a schematic diagram of the force control provided by the electromagnetic active suspension unit in moving the sprung mass upwards from a balanced position (in which the sprung mass is still), in accordance with an embodiment of the present invention.
Figure 14:
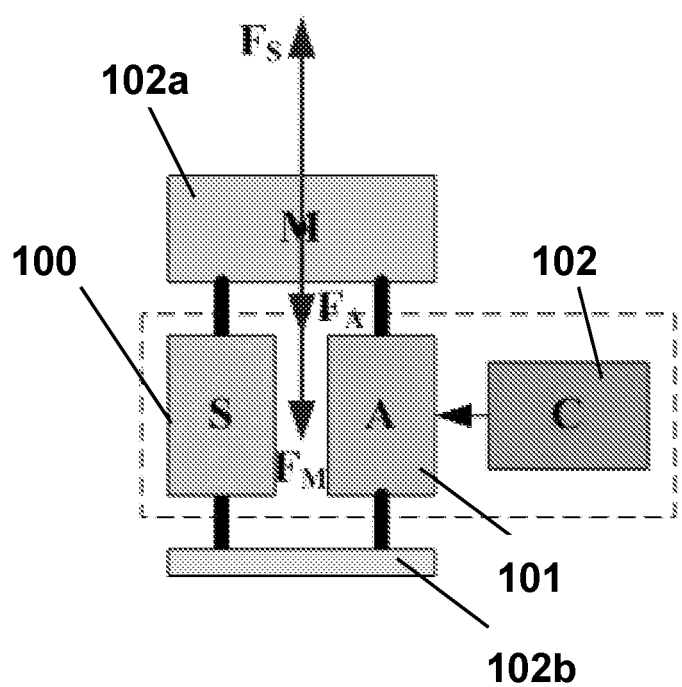
FIG. 14 is a schematic diagram of the force control provided by the electromagnetic active suspension unit in moving the sprung mass downwards from a balanced position (in which the sprung mass is still), in accordance with an embodiment of the present invention.
Figure 15:
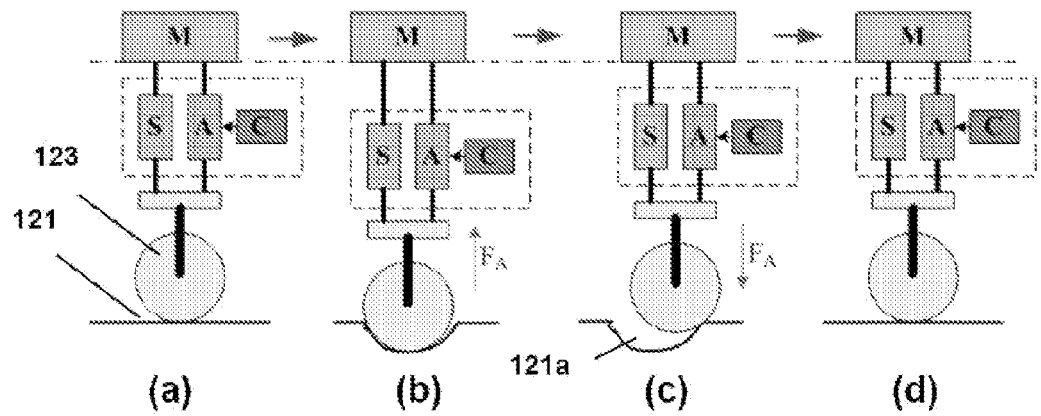
FIG. 15(a)-15(d) is a schematic diagram illustrating operation of the electromagnetic active suspension unit in applying force control to the sprung mass of a vehicle in response to a sunken section of a ground surface traversed by the vehicle, in accordance with an embodiment of the present invention.
Figure 16:
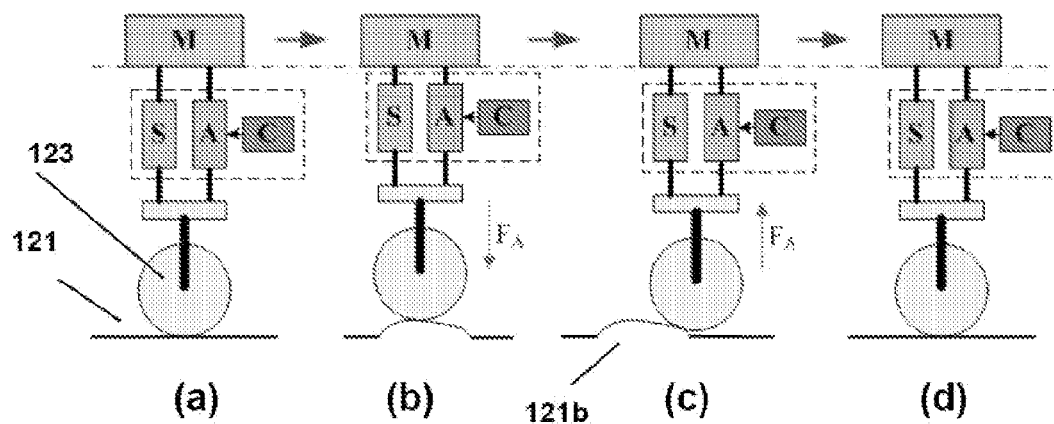
FIG. 16(a)-16(d) is a schematic diagram illustrating operation of the electromagnetic active suspension unit in applying force control to the sprung mass of a vehicle in response to a raised section of a ground surface traversed by the vehicle, in accordance with an embodiment of the present invention.

The electromagnetic active suspension unit will now be described in use in a vehicle traversing a ground surface having sunken and raised section irregularities disposed therein. FIGS. 13 and 14 are schematic diagrams representing the electromagnetic active suspension unit as engaged in parallel between the sprung mass (102a) and unsprung mass (102b) of the vehicle when in the balanced position—that is, where the sprung mass (102a) is substantially still in a vertical orientation. It would be appreciated that the balanced position of the sprung mass (102a) in the system can be pre-calibrated for instance by selection of coil spring (100) properties. The directions of the weight force "FM" of the sprung mass and the passive force "FS" of the coil spring (100) remain the same regardless as to whether the sprung mass is being moved upwards or downwards. FIGS. 13 and 14 also show the direction of the active force "FA" that is to be applied by the electromagnetic active suspension unit in order to move the sprung mass upwards or downwards from the balanced position in response to sunken and raised section irregularities respectively. In each case, the direction of the active force "FA" that is applied is in the same direction as the direction in which the sprung mass (102a) is to be moved from the balanced position.

FIGS. 15(a) to 15(d) depict the force characteristics at work during operation of the electromagnetic active suspension unit as the vehicle is moving from left to right across a ground surface (121) which includes a sunken section (121a). In FIG. 15(a) the vehicle is shown initially engaged with a regular ground surface (121) whereby the sprung mass is in a balanced position. In FIG. 15(b) the wheel (123) encounters the sunken section (121a) of the ground surface (121) and moves downwardly causing the coil spring (100) to stretch. In order to counteract possible downward movement of the sprung mass (102a), an active force "$F_A$" is applied upwardly upon the sprung mass (102a) so as to substantially maintain its vertical position and alleviate pitch and roll motion. The controller unit (102) determines the active force to be applied by the translator shaft (107) in the upward direction by reference to the input sensor circuit readings indicative of the linear displacement of the translator (106), the vertical acceleration of the sprung mass (102a) and the vertical acceleration of the unsprung mass (102b). The controller unit (102) then regulates the magnitude and waveform characteristics of phased currents provided to the stator (105) to produce the suitable active force in order to minimize the displacement and acceleration of the sprung mass (102a).

As the wheel (123) recovers from the sunken road (121a) to the regular surface (121) of the road as shown in FIGS. 15(c)-15(d), the wheel moves upwardly. In response to this upward movement of the wheel (123) detected by the sensor circuit (109), the controller unit (102) reduces the upward active force or regulates the downward active force to prevent the sprung mass (102a) from possible upward motion over the balanced position and thereby maintains the desired vertical position of the sprung mass (102a). Also, as the stretched coil spring (100) returns towards the balanced position, the vertical motion energy of the vehicle absorbed by the coil spring (100) is released. The downward active force and the upward motion of the translator enables dampening of the released energy from the coil spring (100) by way of dissipation or storage in a battery of the vehicle via the bi-directional power flow interface (111) disposed between the controller unit (102) and the linear switched reluctance actuator (101).

FIGS. 16(a) to 16(d) depict the operation of the electromagnetic active suspension unit as the vehicle is moving from left to right across a ground surface (121) which includes a raised section (121b). In FIG. 16(a) the vehicle is shown initially engaged with a regular ground surface (121) whereby the sprung mass (102a) is in a balanced position. In FIG. 16(b) the wheel (123) encounters the raised section (121b) of the ground surface and moves upwardly causing the coil spring (100) to compress. In order to counteract possible upward movement of the sprung mass (102a), an active force "$F_A$" is applied downwardly upon the sprung mass (102a) so as to substantially maintain its desired vertical position and alleviate pitch and roll motion. The controller unit (102) again determines the active force to be applied by the translator (106) in the downward direction by reference to input sensor circuit (109) readings then regulates the magnitude and waveform characteristics of phased currents provided to the linear switched reluctance actuator (101) to produce the suitable active force in order to minimize the displacement and acceleration of the sprung mass (102a).

As the wheel (123) recovers from the raised section (121b) to the regular surface (121) of the road as shown in FIGS. 16(c)-16(d), the wheel (123) moves downwardly. In response to this downward movement of the wheel (123) detected by the sensor circuit (109), the controller unit (102) reduces the downward active force or regulates the upward active force to prevent the sprung mass (102a) from possible downward motion under the balanced position and thereby maintains the desired vertical position of the sprung mass (102a). Also, as the compressed coil spring (100) returns towards the balanced position, the vertical motion energy of the vehicle absorbed by the coil spring (100) is released. The upward active force and the downward motion of the translator enables dampening of the released energy from the coil spring (100) by way of dissipation or storage in the vehicle battery.

In situations where there are frequent irregularities in the ground surface being traversed, it would be readily appreciated by a person skilled in the art that advantageously the controller unit (102) of the linear switched reluctance actuator (101) is capable of rapidly regulating the active force applied by the linear switched reluctance actuator (101) and the displacement of the translator (106) to suitably control upwards and downwards movement of the sprung mass (102a) in response to the irregularities.

Figure 17:
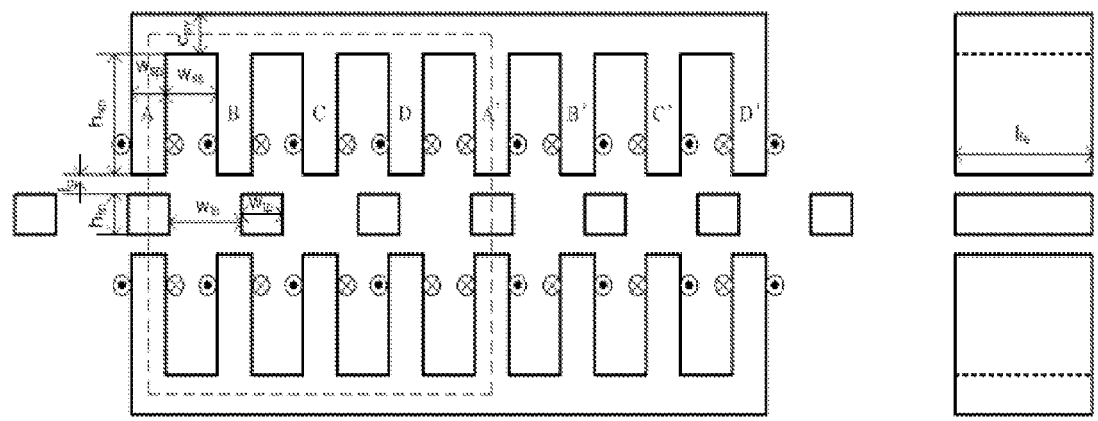
FIG. 17 is a diagram of a linear switched reluctance actuator of an embodiment of the present invention that has been tested by computer simulation in which the relevant design parameters are indicated.
Figure 18:
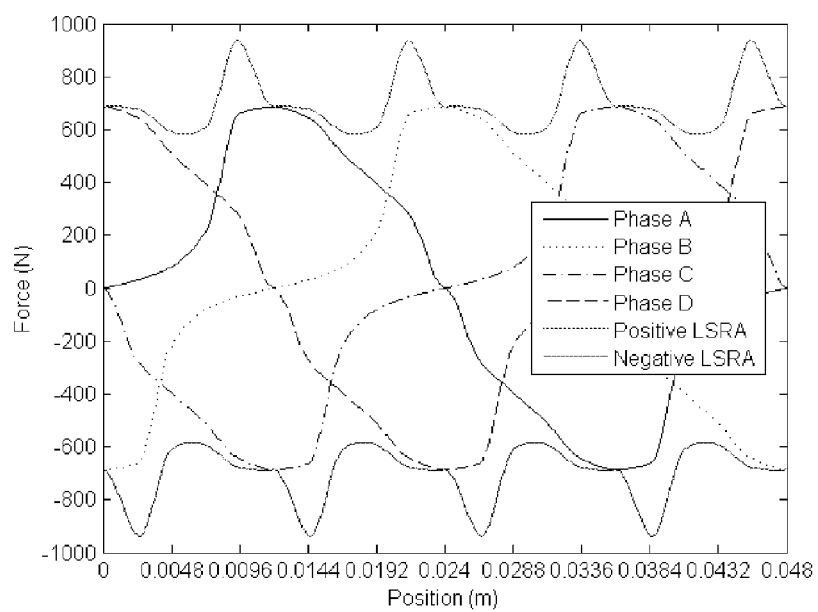
FIG. 18 is a force displacement diagram representing computer simulated operation of an embodiment of the present invention.

The propulsion force characteristics of an embodiment of the present invention has been simulated on a computer using finite element analysis. With reference to FIG. 17, the dimensions of the linear switched reluctance actuator (101) used in the course of the computer simulation were as follows:

Length of air gap (lg): 0.0008 m
Length of stack (lfe): 0.043 m
Width of stator pole (wsp): 0.013 m
Width of stator slot (wss): 0.023 m
Height of stator pole (hsp): 0.049 m
Thickness of stator yoke (csy): 0.013 m
Width of translator/mover pole (wtp): 0.017 m
Width of translator/mover slot (wts): 0.031 m Height of translator/mover pole (htp): 0.013 m
Rated coil current: 11.4 A
Stiffness of spring: 18.6 kN/m The results of the simulation are shown in the force displacement chart in FIG. 18.

Those skilled in the art will appreciate that the invention described herein is susceptible to variations and modifications other than those specifically described without departing from the scope of the invention. All such variations and modification which become apparent to persons skilled in the art, should be considered to fall within the spirit and scope of the invention as broadly hereinbefore described. It is to be understood that the invention includes all such variations and modifications. The invention also includes all of the steps and features, referred or indicated in the specification, individually or collectively, and any and all combinations of any two or more of said steps or features.

The reference to any prior art in this specification is not, and should not be taken as, an acknowledgment or any form of suggestion that that prior art forms part of the common general knowledge.

What is claimed is:

1. An active suspension system suitable for use with a vehicle, comprising:
   a passive suspension element having a first end adapted for rigid engagement to a sprung mass of the vehicle and a second end adapted for rigid engagement to an unsprung mass of the vehicle, the passive suspension element being configured for applying a passive force to the sprung mass; and
   an active suspension element including a linear switched reluctance actuator having a first end adapted for rigid engagement to the sprung mass of the vehicle and a second end adapted for rigid engagement to the unsprung mass of the vehicle wherein the linear switched reluctance actuator is configured for applying an active force to the sprung mass to substantially maintain a predetermined vertical orientation of the sprung mass when the vehicle traverses a road irregularity;
   and wherein the linear switched reluctance actuator includes:
   a frame having a peripheral wall, a top surface and a base defining a frame chamber; a stator rigidly positioned within the frame chamber;
   a translator positioned adjacent the stator within the frame chamber, the translator being configured for electromagnetic engagement with the stator to enable slidable movement of the translator relative to the stator; and
   a translator shaft rigidly engaged to and slidable with the translator for applying the active force to the sprung mass.

2. The active suspension system of claim 1 wherein the passive suspension element includes a coil spring.

3. The active suspension system of claim 2 wherein the coil spring is configured for absorbing vertical motion energy induced in the sprung mass when the vehicle traverses the road irregularity and the linear switched reluctance actuator is configured for dampening the absorbed vertical motion energy by at least one of dissipating the absorbed vertical motion energy and storing the absorbed vertical motion energy in an energy store.

4. The active suspension system of claim 3 including a bi-directional power interface disposed between the controller unit and the linear switched reluctance actuator whereby movement of the translator shaft is able to be converted into energy suitable for storage in the energy store via the bi-directional power interface.

5. The active suspension system of claim 3 wherein the energy store includes a battery of the vehicle.

6. The active suspension system of claim 1 wherein the passive suspension element and the linear switched reluctance actuator are configured for engagement in parallel between the sprung mass and the unsprung mass.

7. The active suspension system of claim 1 wherein:
   the top surface of the frame includes an opening and the base of the frame is configured for rigid engagement to the unsprung mass;
   the translator shaft includes a first end extending outwardly of the opening in the top surface of the frame, the first end of the translator shaft being configured for rigid engagement to the sprung mass and the translator shaft includes an opposed second end enclosed within the frame chamber, the second end of the translator shaft having a recess disposed therein;
   the first end of the coil spring is rigidly engaged to the translator shaft within the recess and the second end of the coil spring is rigidly engaged to the base of the frame wherein the coil spring is able to stretch and compress in axial alignment with the translator shaft.

8. The active suspension system of claim 1 wherein:
   an opening is disposed in the top surface of the frame and the base of the frame is configured for rigid engagement to the unsprung mass;
   the translator shaft includes a hollow chamber between a first and second end of the translator shaft, the first end of the translator shaft extending outwardly of the opening in the top surface of the frame wherein it is configured for rigid engagement to the sprung mass, an opposed second end of the translator shaft enclosed within the frame chamber, the second end of the translator shaft having an opening disposed therein leading into the hollow chamber of the translator shaft;
   the coil spring is disposed within the hollow chamber of the translator shaft wherein a first end of the coil spring is rigidly engaged to the first end of the translator shaft and the second end of the coil spring is rigidly engaged to the base of the frame by an elongate support member wherein the coil spring is able to stretch and compress in axial alignment with the translator shaft within the hollow chamber of the translator shaft.

9. The active suspension system of claim 1 wherein:
   an opening is disposed in the top surface of the frame and the base of the frame is configured for rigid engagement to the unsprung mass;
   the translator shaft includes a first end extending outwardly of the opening in the top surface of the frame wherein it is configured for rigid engagement to the sprung mass and an opposed second end enclosed within the frame chamber, the second end of the translator shaft being rigidly engaged to the base;
   the coil spring is positioned externally of the frame chamber, a first end of the coil spring surrounds the peripheral wall of the frame and abuts against a flanged section extending outwardly from the peripheral wall of the frame, a second end of the coil spring is rigidly engaged to the base of the frame wherein the coil spring is able to stretch and compress in axial alignment with the translator shaft externally of the frame chamber.

10. The active suspension system of claim 1 wherein the stator is rigidly engaged to an inner surface of the peripheral wall within the frame chamber.

11. The active suspension system of claim 1 including a plurality of stators and a plurality of corresponding translators wherein said plurality of translators are rigidly engaged to the translator shaft.

12. The active suspension system of claim 1 wherein the stator includes a double-sided stator.

13. The active suspension system of claim 12 including a controller unit configured for regulating phased currents provided to phased windings of the linear switched reluctance actuator in order to control the active force applied by the linear switched reluctance actuator to the sprung mass.

14. The active suspension system of claim 13 including a sensor circuit configured for providing input sensor readings to the controller unit, the sensor readings being indicative of at least one of a linear displacement of the translator relative to the stator, a vertical acceleration of the sprung mass, and a vertical acceleration of the unsprung mass, wherein the controller unit regulates the phased currents provided to the phased windings by reference to the sensor readings.

15. The active suspension system of claim 13 wherein the phased windings are disposed on the stator.

16. The active suspension system of claim 1 wherein the stator includes a single-sided stator.

17. The active suspension system of claim 1 wherein the stator includes:
a double-sided stator,
a controller unit configured for regulating phased currents provided to phased windings of the linear switched reluctance actuator in order to control the active force applied by the linear switched reluctance actuator to the sprung mass,
a sensor circuit configured for providing input sensor readings to the controller unit, the sensor readings being indicative of at least one of a linear displacement of the translator relative to the stator, a vertical acceleration of the sprung mass, and a vertical acceleration of the unsprung mass,
wherein the controller unit regulates the phased currents provided to the phased windings by reference to the sensor readings.

18. A method of providing active suspension system suitable for use with a vehicle, the method including:
providing a passive suspension element having a first end adapted for rigid engagement to a sprung mass of the vehicle and a second end adapted for rigid engagement to an unsprung mass of the vehicle, the passive suspension element being configured for applying a passive force to the sprung mass; and
providing an active suspension element including a linear switched reluctance actuator having a first end adapted for rigid engagement to the sprung mass of the vehicle and a second end adapted for rigid engagement to the unsprung mass of the vehicle wherein the linear switched reluctance actuator is configured for applying an active force to the sprung mass to substantially maintain a predetermined vertical orientation of the sprung mass when the vehicle traverses a road irregularity;
wherein the linear switched reluctance actuator includes:
a frame having a peripheral wall, a top surface and a base defining a frame chamber;
a stator rigidly positioned within the frame chamber;
a translator positioned adjacent the stator within the frame chamber, the translator being configured for electromagnetic engagement with the stator to enable slidable movement of the translator relative to the stator; and
a translator shaft rigidly engaged to and slidable with the translator for applying the active force to the sprung mass.

19. The method of claim 18 wherein:
the top surface of the frame includes an opening and the base of the frame is configured for rigid engagement to the unsprung mass;
the translator shaft includes a first end extending outwardly of the opening in the top surface of the frame, the first end of the translator shaft being configured for rigid engagement to the sprung mass and the translator shaft includes an opposed second end enclosed within the frame chamber, the second end of the translator shaft having a recess disposed therein;
the first end of the coil spring is rigidly engaged to the translator shaft within the recess and the second end of the coil spring is rigidly engaged to the base of the frame wherein the coil spring is able to stretch and compress in axial alignment with the translator shaft.

20. The method of claim 19 wherein:
an opening is disposed in the top surface of the frame and the base of the frame is configured for rigid engagement to the unsprung mass;
the translator shaft includes a hollow chamber between a first and second end of the translator shaft, the first end of the translator shaft extending outwardly of the opening in the top surface of the frame wherein it is configured for rigid engagement to the sprung mass, an opposed second end of the translator shaft enclosed within the frame chamber, the second end of the translator shaft having an opening disposed therein leading into the hollow chamber of the translator shaft;
the coil spring is disposed within the hollow chamber of the translator shaft wherein a first end of the coil is rigidly engaged to the first end of the translator shaft and the second end of the coil spring is rigidly engaged to the base of the frame by an elongate support member wherein the coil spring is able to stretch and compress in axial alignment with the translator shaft within the hollow chamber of the translator shaft.

21. The method of claim 19 wherein:
an opening is disposed in the top surface of the frame and the base of the frame is configured for rigid engagement to the unsprung mass;
the translator shaft includes a first end extending outwardly of the opening in the top surface of the frame wherein it is configured for rigid engagement to the sprung mass and an opposed second end enclosed within the frame chamber, the second end of the translator shaft being rigidly engaged to the base;
the coil spring is positioned externally of the frame chamber, a first end of the coil spring surrounds the peripheral wall of the frame and abuts against a flanged section extending outwardly from the peripheral wall of the frame, a second end of the coil spring is rigidly engaged to the base of the frame wherein the coil spring is able to stretch and compress in axial alignment with the translator shaft externally of the frame chamber.

22. The method of claim 19 including the step of rigidly engaging the stator to an inner surface of the peripheral wall within the frame chamber.

23. The method of claim 22 including the step of providing a plurality of stators and a plurality of corresponding translators wherein said plurality of translators are rigidly engaged to the translator shaft.

24. The method of claim 22 wherein the stator includes a double-sided stator.

25. The method of claim 24 including a controller unit configured for regulating phased currents provided to phased windings of the linear switched reluctance actuator in order to control the active force applied by the linear switched reluctance actuator to the sprung mass.

26. The method of claim 25 including the step of providing the controller unit with input sensor readings from a sensor circuit, the sensor readings being indicative of at least one of a linear displacement of the translator relative to the stator, a vertical acceleration of the sprung mass, and a vertical acceleration of the unsprung mass, wherein the controller unit regulates the phased currents provided to the phased windings by reference to the sensor readings.

27. The method of claim 25 including the step of arranging the phased windings on the stator.

28. The method of claim 22 wherein the stator includes a single-sided stator.

29. The method of providing active suspension system suitable for use with a vehicle according to claim 18:
   wherein the stator includes:
      a double-sided stator,
      a controller unit configured for regulating phased currents provided to phased windings of the linear switched reluctance actuator in order to control the active force applied by the linear switched reluctance actuator to the sprung mass,
      a sensor circuit configured for providing input sensor readings to the controller unit, the sensor readings being indicative of at least one of a linear displacement of the translator relative to the stator, a vertical acceleration of the sprung mass, and a vertical acceleration of the unsprung mass,
   wherein the controller unit regulates the phased currents provided to the phased windings by reference to the sensor readings.

30. A method of providing active suspension system suitable for use with a vehicle, the method including:
   providing a passive suspension element having a first end adapted for rigid engagement to a sprung mass of the vehicle and a second end adapted for rigid engagement to an unsprung mass of the vehicle, the passive suspension element being configured for applying a passive force to the sprung mass;
   providing an active suspension element including a linear switched reluctance actuator having a first end adapted for rigid engagement to the sprung mass of the vehicle and a second end adapted for rigid engagement to the unsprung mass of the vehicle wherein the linear switched reluctance actuator is configured for applying an active force to the sprung mass to substantially maintain a predetermined vertical orientation of the sprung mass when the vehicle traverses a road irregularity;
   wherein the passive suspension element includes a coil spring;
   wherein the coil spring is configured for absorbing vertical motion energy induced in the sprung mass when the vehicle traverses the road irregularity and the linear switched reluctance actuator is configured for dampening the absorbed vertical motion energy by at least one of dissipating the absorbed vertical motion energy and storing the absorbed vertical motion energy in an energy store; and
   providing a bi-directional power interface between the controller unit and the linear switched reluctance actuator whereby movement of the translator shaft is able to be converted into energy suitable for storage in the energy store via the bi-directional power interface.

31. The method of claim 30 including the step of storing the energy in a battery or an energy storage unit of the vehicle.

* * * * *